(12) United States Patent
Rotsaert

(10) Patent No.: US 9,980,083 B2
(45) Date of Patent: May 22, 2018

(54) METHOD FOR PAIRING IN A PERIPHERAL DEVICE AND IN A COMMUNICATIONS TERMINAL, CORRESPONDING DEVICES AND PROGRAM

(71) Applicant: Roam Data, Inc., Wilmington (DE)

(72) Inventor: Christopher Rotsaert, Wasquehal (FR)

(73) Assignee: INGENICO INC., Alpharetta, GA (US)

( * ) Notice: Subject to any disclaimer, the term of this patent is extended or adjusted under 35 U.S.C. 154(b) by 0 days. days.

(21) Appl. No.: 15/286,118

(22) Filed: Oct. 5, 2016

(65) Prior Publication Data

US 2017/0099568 A1    Apr. 6, 2017

(30) Foreign Application Priority Data

Oct. 5, 2015 (FR) ...................................... 15 59477

(51) Int. Cl.
*H04B 7/00* (2006.01)
*H04W 4/00* (2018.01)
(Continued)

(52) U.S. Cl.
CPC ........ *H04W 4/008* (2013.01); *G06Q 20/3226* (2013.01); *G06Q 20/3278* (2013.01);
(Continued)

(58) Field of Classification Search
CPC ..... H04W 4/008; H04W 12/08; H04W 12/12; H04M 1/7253
(Continued)

(56) References Cited

U.S. PATENT DOCUMENTS

2003/0050009 A1    3/2003  Kurisko et al.
2006/0143455 A1    6/2006  Gitzinger
(Continued)

FOREIGN PATENT DOCUMENTS

FR    3013873 A1    5/2015

OTHER PUBLICATIONS

French Search Report and Written Opinion dated Jun. 6, 2016 for corresponding French Application No. 1559477, filed Oct. 5, 2015.

*Primary Examiner* — Lee Nguyen
(74) *Attorney, Agent, or Firm* — David D. Brush; Westman Champlin & Koehler, P.A.

(57) ABSTRACT

A peripheral device is provided, which can be coupled detachably with a communications terminal. The device includes at least one connector cooperating, when the peripheral device is coupled with the terminal, with at least one complementary connector on the terminal so as to form a wired communications link between the peripheral device and the terminal. The device has a first wireless communications module capable of communicating with a second wireless communications module on the communications terminal when the wireless communications modules are paired with each other; a reception module to receive an identifier of the communications terminal via the wired communications link; a generating module to generate a pairing code in response to the received identifier; and a transmission module to transmit the pairing code to the communications terminal via the wired communications link so as to configure a pairing between the first and second wireless communications modules.

13 Claims, 3 Drawing Sheets

(51) Int. Cl.
- *H04W 76/02* (2009.01)
- *G06Q 20/32* (2012.01)
- *G06Q 20/34* (2012.01)
- *H04W 12/02* (2009.01)
- *H04B 1/00* (2006.01)
- *H04W 88/02* (2009.01)

(52) U.S. Cl.
CPC .......... *G06Q 20/353* (2013.01); *H04W 12/02* (2013.01); *H04W 76/021* (2013.01); *H04W 88/02* (2013.01)

(58) Field of Classification Search
USPC ........................................ 455/41.2, 410, 411
See application file for complete search history.

(56) References Cited

U.S. PATENT DOCUMENTS

| | | | |
|---|---|---|---|
| 2014/0256260 A1 | 9/2014 | Ueda et al. | |
| 2015/0371216 A1* | 12/2015 | Olawale | G06Q 20/3255 705/39 |

* cited by examiner

METHOD FOR PAIRING IN A PERIPHERAL DEVICE AND IN A COMMUNICATIONS TERMINAL, CORRESPONDING DEVICES AND PROGRAM

1. CROSS-REFERENCE TO RELATED APPLICATIONS

This Application claims priority to and the benefit of French Patent Application No. 1559477, filed Oct. 5, 2015, the content of which is incorporated herein by reference in its entirety.

2. FIELD OF THE DISCLOSURE

The disclosure pertains to the field of the pairing of wireless communications devices and relates more particularly to such pairing between a communications terminal and a peripheral device.

3. BACKGROUND OF THE DISCLOSURE

"Mobile point of sale" (mPOS) solutions have been developing very rapidly in recent years. These payment solutions generally use Bluetooth technology to associate a compact bankcard with a smartphone or tablet type of communications terminal for example.

Just as with classic card-based payment solutions, mPOS solutions are faced with security risks that have to be taken into account. The bankcard data (card number, date of expiry, three-digit cryptogram, etc.) or again the card-bearer's PIN code are all sensitive data that fraudulent individuals seek to retrieve by hacking into the information systems of the actors that process and store these pieces of data.

The PCI SSC (PCI Security Standards Council) is the body that issues security recommendations on card payments and, for this purpose, defines the PCI (Payment Card Industry) standards that must be complied with by all the actors concerned, especially banking institutions and merchants. The PCI SSC council has especially created the security standard for payment terminals, namely the PCI PTS (Payment Card Industry PIN Transaction Security) standard. PCI PTS is the security standard currently in force at the international level for payment terminals.

mPOS devices requiring the entry of the card-bearer's PIN code must therefore comply with a certain number of requirements defined by the PCI PTS standard in order to obtain certification from the PCI SSC council. These requirements relate more particularly to the physical and functional security of the payment terminals with PIN code entry. Since January 2015, the PCI PTS standard prohibits, for example, the use of the Bluetooth LE (low energy) or BLE standard for versions below 4.2 in mPOS devices. This prohibition stems from a safety flaw that has been detected in the pairing process for Bluetooth devices using BLE technology below the 4.2 version. Hence, to obtain certification from the PCI SSC authority, all new models of payment terminals presently supporting BLE technology use the 4.2 version.

In an mPOS payment system, therefore, the communications terminal, typically a Smartphone, must support the 4.2 version of the BLE standard. Now, this technology is as yet little used and the passage to BLE 4.2 on a Smartphone or its equivalent is possible only if the customer himself decides to do so.

Thus, a need exists today for an efficient and reliable solution to implementing an mPOS payment system that meets the requirements defined by the PCI PTS standard. In particular, no solution compliant with the PCI PTS standard today enables totally secured paring, in an mPOS system, between a peripheral device (possessing a card reader for example) and a communications terminal of the smartphone or tablet type for example.

4. SUMMARY

An exemplary embodiment of the present disclosure relates to setting up a secured pairing between a peripheral device and a communications device together forming a payment terminal in which it is not necessary for the peripheral device to comprise a display screen or more generally a user interface (screen, keypad, entry interface, etc.).

Novel solutions are needed to enable PCI-PTS-compliant pairing of a peripheral device with a communications terminal in an mPOS system.

Besides, in order especially to limit the space requirement and complexity of a peripheral device cooperating with a communications terminal in an mPOS system, it is proposed to implement a device of this kind that has no user interface (screen, keypad, etc.) whatsoever. However, achieving a pairing according to the PCI PTS standard between a communications terminal and a peripheral device without using a user interface in said peripheral device raises real difficulties.

The present disclosure therefore proposes a solution enabling a secured pairing compliant with the PCI PTS standard between a communications terminal and a peripheral device while at the same time doing away with the need to use any particular user interface at the peripheral device.

To this end, the disclosure proposes a peripheral device that is to be coupled detachably with a communications terminal, the peripheral device comprising:
  at least one connector cooperating, when said peripheral device is coupled with said communications terminal, with at least one complementary connector on the communications terminal so as to form a wired communications link between said peripheral device and the communications terminal;
  a first wireless communications module capable of communicating with a second wireless communications module on the communications terminal;
  a reception module to receive an identifier of the communications terminal via the wired communications link;
  a generating module to generate a pairing code in response to said received identifier; and
  a transmission module to transmit the pairing code to the communications terminal via the wired communications link so as to configure a pairing between said first and second wireless communications modules.

An exemplary embodiment of the disclosure thus enables the secured pairing of the wireless communications means of a communications terminal on the one hand and a peripheral device on the other hand. This pairing is achieved without its being necessary to use any particular user interface or even to have such a device present in the peripheral device. An embodiment especially makes it possible to achieve a pairing of this kind, of the Bluetooth type for example, in compliance with the PCI PTS standard even when the Bluetooth protocol version installed is lower than 4.2.

According to one particular embodiment, the communications terminal comprises a processing module, the transmission module being configured to trigger the configuration, by the processing module of the communications terminal, of said pairing through said pairing code received.

According to one particular embodiment, the pairing between said first and second wireless communications modules is of the Bluetooth or Wi-Fi type.

According to one particular embodiment, the peripheral device is configured to act as a master device in said pairing.

According to one particular embodiment, the identifier comprises the network address (the MAC address for example) of the communications terminal.

According to one particular embodiment, the generating module is configured to randomly generate the pairing code.

According to one particular embodiment, the peripheral device is a peripheral payment device comprising a card reader that is to cooperate with a card to implement a payment transaction.

The present disclosure also proposes a communications terminal to be coupled detachably with a peripheral device comprising:
- at least one connector capable of cooperating, when said communications terminal is coupled with the peripheral device, with at least one complementary connector on the peripheral device so as to form a wired communications link between said peripheral device and the communications terminal;
- a first wireless communications module capable of communicating with a second wireless communications module on the peripheral device when said wireless communications modules are paired with each other;
- a transmission module to transmit an identifier of the communications terminal to the peripheral device via the wired communications terminal;
- a reception module to receive a pairing code from the peripheral device in response to said sent identifier, via the wired communications link; and
- a processing module to configure said pairing between the first and second wireless communications modules from the received pairing code.

The advantages described here above with reference to the peripheral device apply by analogy to the communications terminal.

According to one particular embodiment, the processing module is configured to compare the pairing code with a reference code and to activate said pairing only if the pairing code and the reference code coincide with each other.

According to one particular embodiment, the processing module is configured to automatically configure said pairing in using the pairing code without human intervention via any particular user interface in said communications terminal.

According to one particular embodiment, the communications terminal comprises a user interface, the processing module being configured to cause the presentation, by the user interface, of the pairing code to a user in order to enable the configuration of said pairing.

The use of the user interface remotely at the communications terminal ensures that the peripheral device has high compactness and low complexity while at the same time ensuring secured pairing of the wireless communications means in question.

According to one particular embodiment, the user interface is configured to display the pairing code.

The disclosure also relates to a system comprising:
- a peripheral device as defined here above; and
- a communications terminal as defined here above.

The disclosure furthermore proposes a method for pairing implemented by a peripheral device to be coupled detachably with a communications terminal, said method comprising the following steps:
- coupling at least one connector of the peripheral device with at least one complementary connector to the communications terminal so as to form a wired communications link between said peripheral device and the communications terminal;
- receiving an identifier of the communications terminal via the wired communication link;
- generating a pairing code in response to the reception of said identifier;
- and transmitting the pairing code to the communications terminal, via the wired communications link, so as to configure a pairing between a first wireless communications module of the peripheral device and a second wireless communications module of the communications terminal, said pairing enabling said wireless communications modules to communicate together.

The disclosure also proposes a method for pairing implemented in a communications terminal that is to be coupled detachably with a peripheral device comprising the following steps:
- coupling at least one connector of the communications terminal with at least one complementary connector to the peripheral device so as to form a wired communications link between the communications terminal and the peripheral device;
- transmitting an identifier of the communications terminal to the peripheral device via the wired communications link;
- receiving a pairing code from the peripheral device in response to said sent identifier, via
- configuring, from the pairing code, a pairing between a first wireless communications module of the communications terminal and a second wireless communications module on the peripheral device so that said wireless communications modules can communicate together.

It is to be noted that the different embodiments described here above with reference to the peripheral device on the one hand and the communications terminal on the other hand as well as the advantages associated with these methods can be applied by analogy to the pairing methods defined here above.

In one particular embodiment, the different steps of the pairing method implemented by the peripheral device are determined by computer program instructions.

Similarly, in one particular embodiment, the different steps of the pairing method implemented by the communications terminal are determined by computer program instructions.

As a consequence, the disclosure also pertains to a computer program on an information medium (or recording medium), this program being liable to be implemented in a peripheral device and/or in a communications terminal or more generally in a computer, this program comprising instructions suited to the implementation of the steps of at least one of the pairing methods as defined here above.

This program can use any particular programming language and be in the form of source code, object code or a code that is intermediary between source code and object code, such as in a partially compiled form or in any other desirable form whatsoever.

The disclosure also relates to a computer-readable information medium (or recording medium) comprising instructions of a computer program as mentioned here above.

The information medium can be any entity or device whatsoever capable of storing the program. For example, the carrier can comprise a storage means such as a ROM, for example a CD-ROM or a microelectronic circuit ROM or again a magnetic recording means such as a floppy disk or a hard disk drive.

Besides, the information medium can be a transmissible medium such as an electrical or optical signal which can be conveyed via an electrical or optical cable by radio or by other means. The program according to an embodiment of the disclosure can be especially uploaded to an Internet type network.

As an alternative, the information medium can be an integrated circuit characterized in that said program is incorporated, the circuit being adapted to executing or being used in the execution of at least one unspecified method of the methods in question.

One embodiment is implemented by using software and/or hardware components. In this respect, the term "module" in this document can correspond equally well to a software component as to a hardware component or to a set of hardware and software components.

A software component corresponds to one or more computer programs, one or more sub-routines of a program, or more generally to any element of a program or software capable of implementing a function or a set of functions according to what is described here below for the module concerned. Such a software component is executed by a data processor of a physical entity (terminal, server, gateway, router, etc.) and is capable of accessing the hardware resources of this physical entity (memories, recording media, communications buses, input/output electronic cards, user interfaces, etc.).

In the same way, a hardware component corresponds to any element of a hardware unit capable of implementing a function or a set of functions according to what is described here below for the module concerned. It can be a programmable hardware component or one with an integrated processor for the execution of software, for example an integrated circuit, a smartcard, a memory card, an electronic card to execute firmware, etc. Each component of the above-described system naturally implements its own software modules.

It must also be noted besides that the different embodiments mentioned here above can be combined with one another to implement the present technique.

5. BRIEF DESCRIPTION OF THE DRAWINGS

Other features and characteristics of the present disclosure shall appear from the following description made with reference to the appended drawings which illustrate examples of embodiments thereof that are in no way restrictive. Of these figures:

FIG. 1 is a schematic view of the structure of a peripheral device and a communications terminal according to one particular embodiment;

FIGS. 2 and 3 schematically represent modules implemented respectively in a peripheral device and a communications terminal represented in FIG. 1;

6. DESCRIPTION

Figure 1:
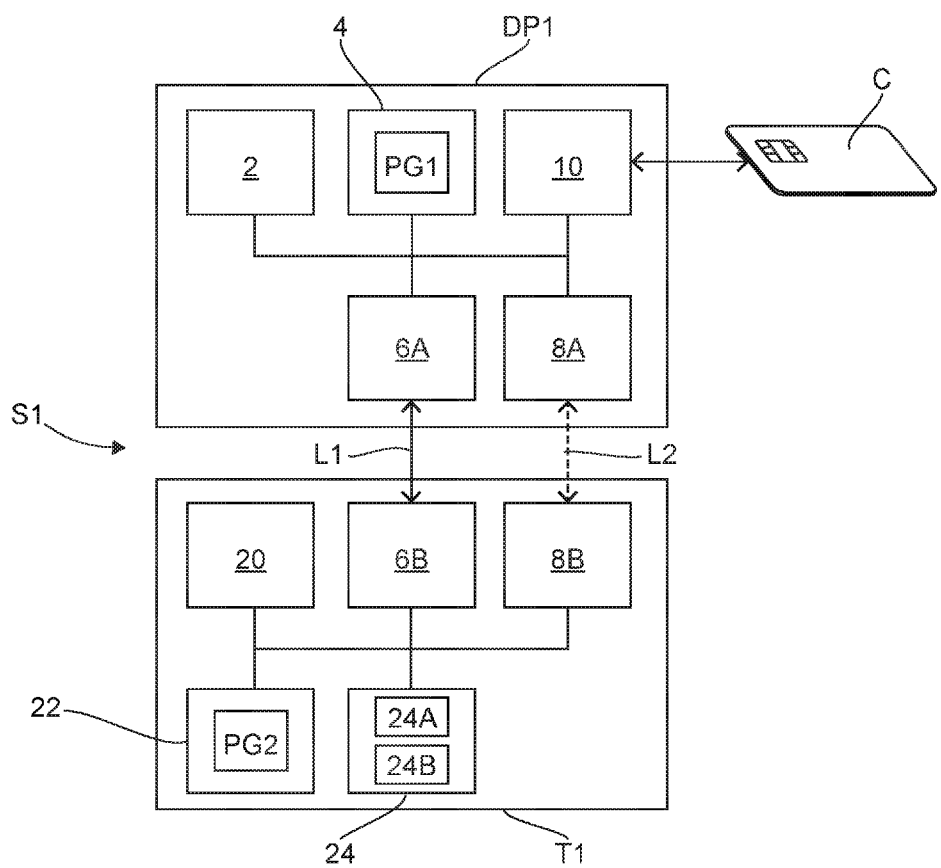

As indicated here above, the proposed technique pertains to the pairing of wireless communications devices and relates more particularly to a solution enabling a secured PCI-PTS-compliant pairing between a communications terminal and a peripheral device in removing the need for using any particular user interface in the peripheral device.

The term "user interface" is understood to mean any means enabling a user to interact with an electronic device such as a communications terminal for example. A user interface can comprise for example a display screen (or any other display means) and/or a keypad or keyboard (or any type of button, actuator, etc.).

An exemplary embodiment of the disclosure proposes to optimize the process of pairing between the wireless communications means of a peripheral device and those of a communications terminal by using especially complementary connectors present in the communications terminal and in the peripheral device.

One embodiment proposes to use a user interface present on the communications terminal to carry out their pairing. Using the user interface remotely from the communications terminal makes it possible advantageously to obtain a secured pairing while removing the need for the use of any particular user interface in the peripheral device itself. Other embodiments that do not make use of a user interface in the communications terminal can however be envisaged in the context of the present technique.

One or more different embodiments thus implements a connector on the peripheral device and a complementary connector on the communications terminal. In coupling these connectors together, it is possible to set up a wired communication between the peripheral device and the communications terminal. The peripheral device is capable, through this wired communication, of transmitting a pairing code which the communications terminal can advantageously use to configure or carry out the pairing between its own wireless communications means and those of the peripheral device. If necessary, a user interface of the communications terminal can be advantageously used to enable a user to take part in a pairing process between the wireless communications means of the peripheral device and those of the communications terminal.

The use of the connectors and, if necessary, of the user interface of the communications terminal advantageously sets up a secured wireless connection between the peripheral device and the communications terminal. Advantageously, the pairing is done in compliance with the PCI PTS standard without a user interface being necessary in the peripheral device.

In one particular embodiment, the peripheral device does not have any display screen. In one particular embodiment, the peripheral device does not have any user interface.

Other features and advantages of one or more embodiments of the present disclosure shall appear from the examples of embodiments described here below with reference to the drawings mentioned here above.

Unless otherwise stated, the common or similar elements seen in several figures carry the same reference signs and have identical or similar characteristics so that, for the sake of simplicity, these common elements are generally not described again.

FIG. 1 is a schematic view of a structure of a peripheral device (here below called a peripheral) DP1 and a communications terminal T1 (here below called a terminal) compliant with a particular embodiment. The peripheral DP1 and the terminal T1 are capable of cooperating together to form a system S1.

In one particular embodiment, the system S1 is an electronic payment terminal, for example a card payment terminal (for example of the mPOS type).

It will be understood that certain elements generally present in a communications terminal, and in a peripheral that is to cooperate with such a terminal, have been deliberately omitted because they are not necessary for the understanding of the present disclosure.

The peripheral DP1 is to be coupled detachably with the terminal T1. This peripheral takes for example the form of a security module or security stick (or dongle) configured to be coupled detachably to the terminal T1.

More specifically, in this example the peripheral DP1 comprises a processor 2 (or more generally a controller), a non-volatile memory 4, a connector 6A, a wireless communications interface 8A and a card reader 10.

The memory 4 is a re-writable, non-volatile memory or a read-only memory (ROM), this memory constituting a recording medium according to one particular embodiment, readable by the peripheral device DP1, and on which a computer program PG1 according to a particular embodiment is recorded. This computer program PG1 comprises instructions for executing steps of the method of pairing according to one particular embodiment.

The connector 6A is capable of being detachably coupled to a complementary connector 6B present on the terminal T1. The coupling of the connectors 6A and 6B makes it possible to set up a wired communications link L1 between the peripheral DP1 and the terminal T1.

According to one particular embodiment, the connectors 6A and 6B are "jack" type audio connectors for example. Other variants (USB connectors, micro-USB connectors, etc.) can be envisaged without departing from the framework of the disclosure.

It must be noted that the connector 6A and the connector 6B can actually each comprise a plurality of connectors. The number and location of the connectors 6A and 6B can be adapted as the case may be.

The wireless communications interface 8A is capable of being paired with a corresponding wireless communications interface (denoted as 8B) present in the terminal T1. Setting up this pairing makes it possible to establish a wireless communications link L2 between the wireless communications interfaces 8A and 8B.

According to one particular embodiment, the wireless communications link L2 is of a Bluetooth type, for example Bluetooth 3.0. The Bluetooth standard 3.0 is especially an advantageous alternative as compared with BLE 4.2 inasmuch as Bluetooth 3.0 is currently used to a greater extent in customer terminals of the smartphone tablet and personal computer type for example.

Other types of wireless communication however can be envisaged, for example Wi-Fi type wireless communications.

The peripheral DP1 and the terminal T1 can cooperate together through the wireless communications link L2, once this link has been set up, in order to carry out a given function such as for example a transaction with a smartcard.

To this end, the peripheral DP1 comprises in this example a card reader 10 capable of contactless cooperation with a smartcard C. In this particular example, the smartcard C is a payment card.

Figure 2:
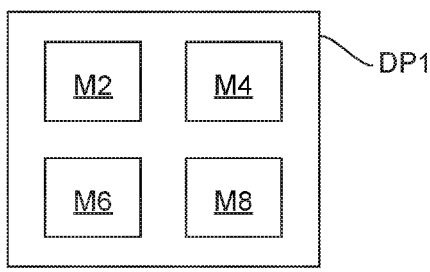

The processor 2 driven by the computer program PG1 herein implements a certain number of modules represented in FIG. 2, namely a wireless communications module M2 capable of communicating through the wireless link L2 with the terminal T1 in using the wireless communications interface 6A, a reception module M4 for receiving a terminal identifier T1 through the wireless communications link L1, a generation module M6 to generate a pairing code and a transmission module M8 to transmit said pairing code to the terminal T1 through the wired communications link L1.

According to one particular embodiment, the peripheral DP1 has no screen. As an alternative, the peripheral DP1 has no screen or keypad. The peripheral DP1 can thus be particularly compact and have limited complexity. For example, should the peripheral DP1 take the form of a detachable security box for dongle) it is advantageous not to integrate any screen or button, keypad, etc. therein in order to limit the cost, complexity and size of the peripheral DP1.

According to one particular embodiment, the peripheral DP1 does not have any particular user interface.

Besides, the communications terminal T1 can be a Smartphone, a tablet or any other appropriate communications terminal. In this example, this terminal comprises a processor 20 (or more generally a controller), the connector 6B and the wireless communications interface already mentioned here above, a non-volatile memory 20 and a user interface 24.

As already indicated, the connector 6B is capable of being coupled detachably with the complementary connector 6A so as to set up a wired connection L1 between the peripheral DP1 and the terminal T1. The wireless communications interface 8B is furthermore capable of being paired with the complementary wireless communications interface 8A so as to set up a wireless connection L2 between the peripheral DP1 and the terminal T1.

The memory 22 is a rewritable, non-volatile memory or a read-only memory (ROM), this memory constituting a recording medium compliant with a particular embodiment, readable by the peripheral device DP1 and on which there is recorded a computer program PG2 compliant with one particular embodiment. This computer program PG2 comprises instructions to execute the steps of a pairing method according to one particular embodiment.

The user interface 24 in this example comprises a display screen 24A and a keypad 24B comprising at least one key (of any unspecified type) that a user can actuate to interact with the terminal T1. As explained here below, in this particular example, the presence of such a user interface at the terminal T1 is not necessarily required to implement an embodiment of the disclosure.

Figure 3:
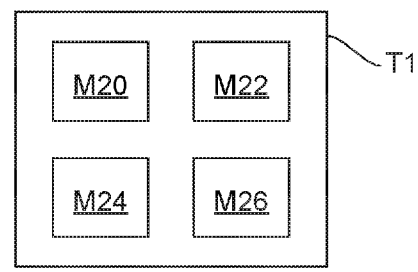

The processor 20 driven by the computer program PG2 implements a certain number of modules shown in FIG. 3, namely a wireless communications module M20 capable of communicating via the wireless link L2 with the wireless communications module M2 of the peripheral DP1 in using the wireless communications interface 6B, a transmission module M22 to transmit an identifier of the terminal T1 through the wired communications link L1, a reception module M24 to receive a pairing code of the peripheral DP1, and a processing module to configure the pairing between the wireless communications modules M2 and M20 from the pairing code received.

In one particular embodiment, the modules M20, M22, M24 and M26 are controlled by means of a specific application implemented in the terminal T1.

Figure 4:
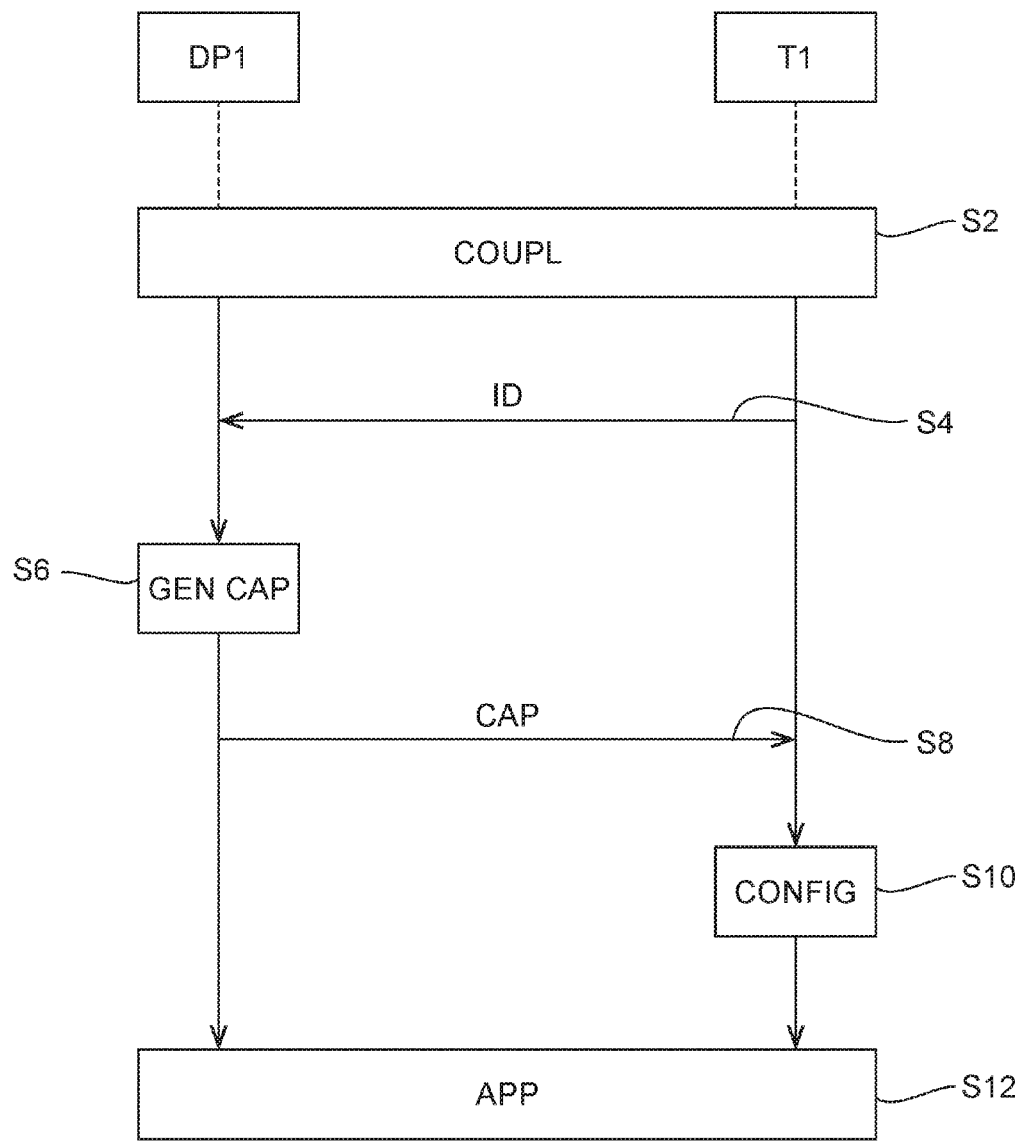
FIG. 4 is a flowchart representing the steps of a pairing method implemented by the peripheral device and the communications terminal shown in FIG. 1, according to one particular embodiment.

The main steps performed during a pairing method by the peripheral DP1 on the one hand and the terminal T1 on the other hand are illustrated in FIG. 4 and comprise more particularly:
- the connectors 8A and 8B are coupled (S2) so as to set up the wireless communications link L1;
- the terminal T1 sends (S4) the peripheral DP1 an identifier ID of the terminal T1 through the wired link L1;
- in response to said received identifier ID, the peripheral DP1 generates (S6) a pairing code CAP and then sends (S8) said pairing code CAP to the terminal T1 in order to enable the pairing between the wireless communications modules M2 and M20; and
- the terminal T1 configures (S10) the pairing between the wireless communications modules M2, M20 by means of the received pairing code CAP so that said wireless communications modules can communicate together via the wireless link L2.

Figure 5:
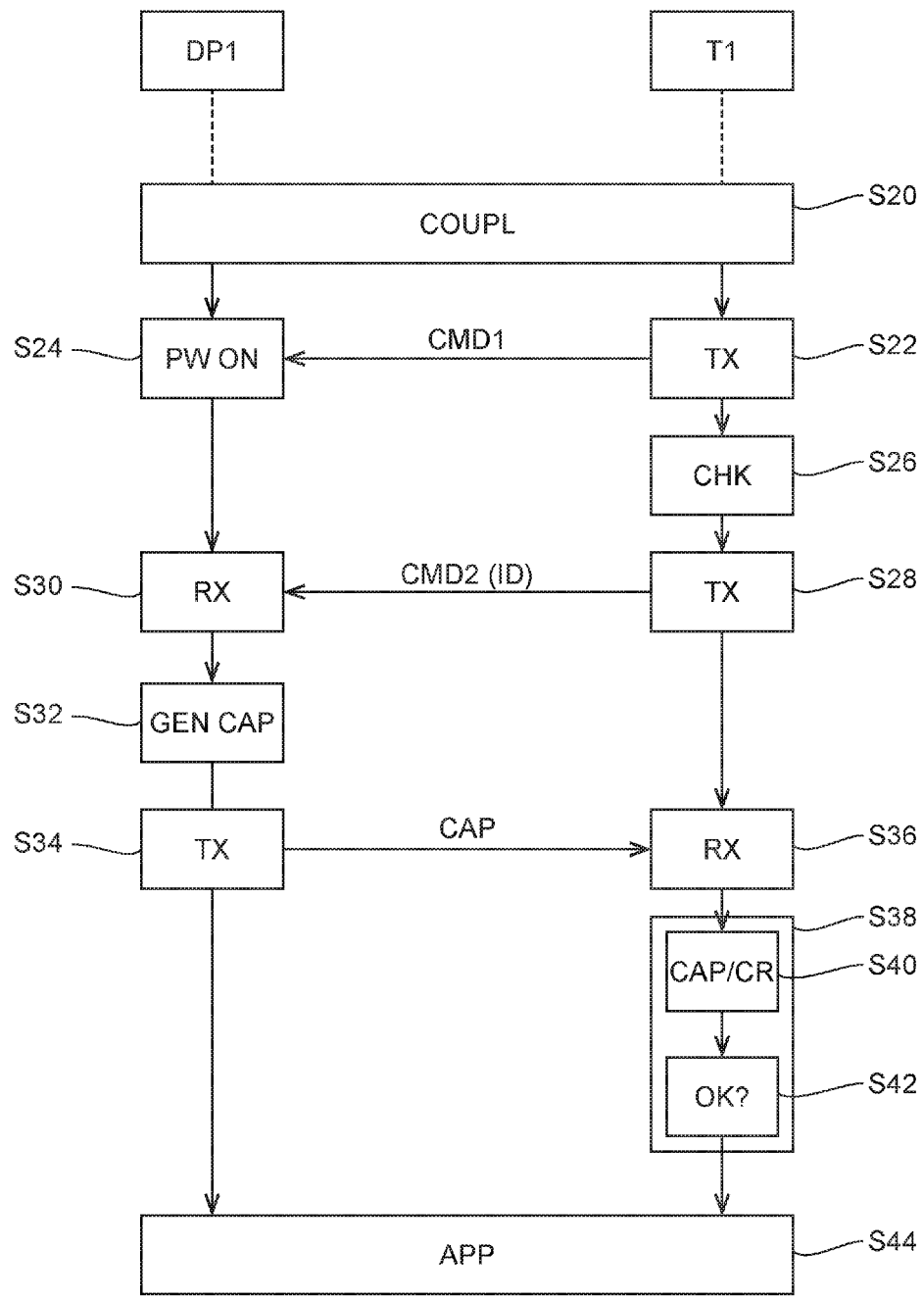
FIG. 5 is a flowchart representing the steps of a pairing method implemented by the peripheral device and the communications terminal shown in FIG. 1, according to one particular embodiment.

A particular mode of installation is now described with reference to FIG. 5. More specifically, the peripheral DP1 and the terminal T1 each implement a method of pairing by respectively executing the computer program PG1, PG2.

It will be assumed in this embodiment that the pairing between the wireless communications modules M2, M20 is of the Bluetooth type.

During a coupling step S20, the connectors 6A and 6B are coupled (detachably) to each other so as to set up a wired communications link L1 as described here above with reference to the step S2.

Upon detection of this coupling S20, the transmission module M22 of the terminal T1 sends a command CMD1 to the peripheral DP1 through the wired link L1. This command CMD1 causes the peripheral DP1 (assumed to be hitherto off or on standby) to start up. It must be noted that other ways of putting the peripheral DP1 into operation can be envisaged. According to one variant, the starting up command CMD1 is transmitted by the transmission module M22 upon a user's command by means of the user interface 24. In one particular example, appropriate pressure on a specific key of the keypad 24B of the terminal T1 initiates the peripheral DP1 (this can be done if need be before the coupling S20).

The terminal T1 then verifies (S26) that the Bluetooth function is activated (and activates this function if need be).

During a transmission step S28, the transmission module M22 transmits an identifier ID of the terminal T1 to the peripheral DP1 through the wired link L1. This identifier ID is for example a network address of the terminal T1. In one particular example, the identifier ID is the MAC address (in this case Bluetooth MAC) of the terminal T1.

In the example considered herein, the identifier ID is sent in a pairing command CMD2, this command requesting the peripheral DP1 to launch the process of pairing between the wireless communications modules M2 and M20.

The reception module M4 receives the identifier ID of the terminal T1 in the reception step S30.

In response to this identifier ID, the peripheral DP1 starts the Bluetooth pairing process between the wireless communications means M2 and M20 (and more particularly between the interfaces 8A and 8B).

More specifically, the generation module M6, in response to the received identifier ID, generates a pairing code CAP intended to enable said pairing. In this particular example, the peripheral DP1 generates the pairing code CP1 as a master device in compliance with the Bluetooth standard. The pairing code CAP is for example a code of the SSP (Secure Sample Pairing), "Passkey entry" or SSP "Numeric comparison" type compliant with the Bluetooth standard.

Various ways of generating the pairing code CAP can be envisaged within the framework of the present technique. In one particular example, the generating module M6 generates the pairing code CAP randomly. This is for example a code having six or more characters in compliance with the PCI PTS standard.

During the transmission step S34, the transmission mode M8 transmits the pairing code CAP to the terminal T1 through the wired link L1.

Once the pairing code CAP has been received (S36) by the reception module M24, the terminal T1 goes to the configuration step S38 during which it carries out the pairing between the wireless communications modules M2, M20.

To this end, the processing module M26 of the terminal T1 uses the received pairing code CAP to configure (S38) or activate the pairing between the wireless communications modules M2, M20 of the peripheral device DP1 and the terminal T1 respectively. The configuration S38 by the processing module M26 can automatically cause the activation of the pairing in question. As an alternative, at least one human intervention is furthermore necessary at the terminal T1 to trigger the pairing between the wireless communication modules M2, M20.

More particularly, in the embodiment considered here, the processing module M26 determines (S40) a reference code CR and compares (S40) the pairing code CAP received with said reference code CR. The way in which this reference code is obtained, and possibly stored beforehand, by the terminal T1 can vary according to the case at hand and can be adapted by those skilled in the art to the context of use. The processing module M26 is then configured to carry out the pairing (S44), in this case of the Bluetooth type, between the wireless communications modules M2, M20 only if the pairing code CAP and the reference code CR coincide with each other.

According to one particular example, the wireless communications link L2 which results from the pairing is of the following types: Bluetooth 2.1 or later versions, Wi-Fi (with the use of a WPA security code) in compliance with the PCI PTS standard.

Besides, in the example considered here, the processing module M26 automatically configures (S38) the pairing between the wireless communications modules M2, M20 from the received pairing code CAP, without any human intervention, via any particular user interface at the terminal T1. Thus, the presence of such a user interface 24 at the terminal T1 is not necessary to implement this particular embodiment. Advantageously, the pairing is then carried out transparently to the user. The operating system of the terminal T1 must however be adapted to authorizing such an implementation of the disclosure.

According to one alternative embodiment, during the configuration S38, the processing module M26 makes the user take action in the configuration of the pairing process. It will be understood that the degree of automation or of action by the user in the pairing process can be adapted to the context of use.

Thus, the processing module M26 can be configured to bring about the presentation of the pairing code CAP through the user interface 24 of the terminal T1 so that said pairing can be validated by the user. This presentation can for example take the form of a display of the pairing code CAP on the screen 24A. The user activates the pairing between the wireless communications modules M2, M20 by means of this pairing code CAP by using the screen 24A and the keypad 24B.

According to a first example, the processing module M26 causes the automatic display on the screen 24A of the pairing code CAP received and the reference code CR. It is then up to the user to compare these two codes and validate the pairing through the user interface 24 only if the codes CAP and CR coincide with each other.

According to another example, the user must himself manually enter (or copy and paste) the pairing code CAP (displayed on the screen) into the appropriate target field.

As already indicated, the comparison of the pairing code CAP and the reference code CR can be automated so that the processing module M26 activates the pairing of wireless communications modules M2, M20 only if the right pairing code is entered into the target field in question (in other words only if the pairing code CAP corresponds to the reference code CR, the latter being possibly displayed or not displayed on the screen 24A as the case may be).

As already indicated, once the pairing (S44) has been done, it enables the wireless communications modules M2 and M20 to communicate together via the link L2.

Besides, in the example considered here, the peripheral DP1 is a peripheral card-payment device making it possible, once coupled to the terminal T1, to form a card payment terminal. The payment card C is for example inserted into the reader 10 so that these two elements cooperate together by contact. The peripheral DP1 and the terminal T1 cooperate together via the wireless communications link L2 in order to carry out a given function such as for example a payment transaction by contact requiring the entry of the PIN code of the card by the user. To this end, the user enters the PIN code by means of the user interface 24 of the terminal T1.

An exemplary embodiment of the disclosure advantageously enables the secured pairing of the wireless communications means of a communications terminal on the one hand and a peripheral device on the other hand. This pairing is done without its being necessary to use any particular user interface, or even for such an interface to be present, at the peripheral device.

In one particular case, the use of the user interface remotely communications terminal makes it possible especially to ensure high compactness and limited complexity of the peripheral device while at the same time ensuring secured pairing of the wireless communications means in question.

As an alternative, the pairing can be done without even making use of a user interface on the communications terminal side. When especially the operating system of the communications terminal allows it, no user interface is used or even present in the terminal: the entire process of pairing is managed automatically. It is thus possible to limit the use of a user interface to the maximum extent and to facilitate the process of pairing for the user.

An exemplary embodiment of the disclosure makes it possible in particular to obtain such a pairing, of the Bluetooth type for example, in compliance with the PCI PTS standard between a communications terminal (for example of the Smartphone, tablet or other equivalent type) and a peripheral device such as a card reader for example (in an mPOS system for example). It is thus possible to secure the association of a communications terminal with a card reader together forming a card-payment reader requiring the entry of the PIN code.

Those skilled in the art will understand that the embodiments and variants described here above are only non-exhaustive examples of implementation. In particular, those skilled in the art could envisage any combination whatsoever of variants and embodiments described here above in order to meet a very particular need.

The invention claimed is:

1. A peripheral device that is to be coupled detachably with a communications terminal, the peripheral device comprising:
   at least one connector cooperating, when said peripheral device is coupled with said communications terminal, with at least one complementary connector on the communications terminal so as to form a wired communications link between said peripheral device and the communications terminal;
   a first wireless communications module capable of communicating with a second wireless communications module on the communications terminal when said wireless communications modules are paired with each other;
   a reception module to receive an identifier of the communications terminal via the wired communications link;
   a generating module to generate a pairing code in response to said received identifier; and
   a transmission module to transmit the pairing code to the communications terminal via the wired communications link so as to configure a pairing between said first and second wireless communications modules.

2. The peripheral device according to claim 1, wherein said communications terminal comprises a processing module, the transmission module being configured to trigger the configuration, by the processing module of the communications terminal, of said pairing through said pairing code received.

3. The peripheral device according to claim 1, wherein the pairing between said first and second wireless communications modules is of the Bluetooth or Wi-Fi type.

4. The peripheral device according to claim 3, wherein the peripheral device is configured to act as a master device in said pairing.

5. The peripheral device according to claim 1, wherein the identifier comprises the network address of the communications terminal.

6. The peripheral device according to claim 1, wherein the generating module is configured to randomly generate the pairing code.

7. The peripheral device according to claim 1, wherein the peripheral device is a peripheral payment device comprising a card reader cooperates with a card to implement a payment transaction.

8. A communications terminal to be coupled detachably with a peripheral device comprising:
   at least one connector capable of cooperating, when said communications terminal is coupled with the peripheral device, with at least one complementary connector on the peripheral device so as to form a wired communications link between said peripheral device and the communications terminal;
   a first wireless communications module capable of communicating with a second wireless communications module on the peripheral device when said wireless communications modules are paired with each other;
   a transmission module to transmit an identifier of the communications terminal to the peripheral device via the wired communications terminal;

a reception module to receive a pairing code from the peripheral device in response to said sent identifier, via the wired communications link; and a processing module to configure said pairing between the first and second wireless communications modules from the received pairing code.

9. The communications terminal according to claim 8, wherein the processing module is configured to compare the pairing code with a reference code and to activate said pairing only if the pairing code and the reference code coincide with each other.

10. The communications terminal according to claim 9, wherein the processing module is configured to automatically configure said pairing in using the pairing code without human intervention via any particular user interface in said communications terminal.

11. The communications terminal according to claim 8, further comprising a user interface, the processing module being configured to cause a presentation, by the user interface, of the pairing code to a user in order to enable the configuration of said pairing.

12. A method for pairing implemented by a peripheral device to be coupled detachably with a communications terminal, said method comprising the following acts:

coupling at least one connector of the peripheral device with at least one complementary connector to the communications terminal so as to form a wired communications link between said peripheral device and the communications terminal;

receiving an identifier of the communications terminal via the wired communication link;

generating the pairing code in response to the reception of said identifier; and transmitting the pairing code to the communications terminal, via the wired communications link, so as to configure a pairing between a first wireless communications module of the peripheral device and a second wireless communications module of the communications terminal, said pairing enabling said wireless communications modules to communicate together.

13. A method for pairing implemented in a communications terminal that is to be coupled detachably with a peripheral device comprising the following acts:

coupling at least one connector of the communications terminal with at least one complementary connector to the peripheral device so as to form a wired communications link between the communications terminal and the peripheral device;

transmitting an identifier of the communications terminal to the peripheral device via the wired communications link;

receiving a pairing code from the peripheral device in response to said sent identifier, via the wired communications link; and configuring, from the pairing code, a pairing between a first wireless communications module of the communications terminal and a second wireless communications module on the peripheral device so that said wireless communications modules can communicate together.

* * * * *